United States Patent
Jauss

(10) Patent No.: US 6,845,616 B2
(45) Date of Patent: Jan. 25, 2005

(54) INTERNAL COMBUSTION ENGINE WHICH CAN BE OPERATED WITH A CHOICE OF DIFFERENT FUELS, ESPECIALLY FOR A MOTOR VEHICLE DRIVE SYSTEM

(75) Inventor: Andreas Jauss, Westernohe (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/469,116
(22) PCT Filed: Nov. 30, 2001
(86) PCT No.: PCT/DE01/04510
§ 371 (c)(1),
(2), (4) Date: Aug. 25, 2003
(87) PCT Pub. No.: WO02/48528
PCT Pub. Date: Jun. 20, 2002

(65) Prior Publication Data
US 2004/0144371 A1 Jul. 29, 2004

(30) Foreign Application Priority Data
Dec. 14, 2000 (DE) .......................... 100 62 391

(51) Int. Cl.[7] .......................... F02D 19/06; F02B 69/02; F02B 69/04
(52) U.S. Cl. ................ 60/601; 60/607; 60/608; 60/611; 123/27 GE; 123/525; 123/526; 123/559.3; 123/564; 123/565; 123/575; 701/100
(58) Field of Search .......................... 60/601, 607, 608, 60/611; 123/27 GE, 525, 526, 559.3, 564, 565, 575; 701/100

(56) References Cited

U.S. PATENT DOCUMENTS

| | | | |
|---|---|---|---|
| 4,603,674 A | * 8/1986 | Tanaka | 123/575 |
| 4,884,530 A | 12/1989 | Boekhaus et al. | 123/525 |
| 5,131,228 A | * 7/1992 | Mochizuki et al. | 123/575 |
| 5,526,645 A | 6/1996 | Kaiser | 123/564 |
| 5,546,908 A | * 8/1996 | Stokes | 123/525 |
| 6,230,683 B1 | * 5/2001 | zur Loye et al. | 123/525 |
| 6,457,312 B2 | * 10/2002 | Fahringer et al. | 60/611 |
| 6,694,242 B2 | * 2/2004 | Wong | 123/526 |

FOREIGN PATENT DOCUMENTS

| | | |
|---|---|---|
| DE | 4025018 A1 | 2/1991 |
| DE | 195 39 170 A | 4/1997 |
| EP | 0 027 689 A1 | 4/1981 |
| EP | 0 430 153 A | 6/1991 |
| GB | 2 236 872 A | 4/1991 |
| JP | 60 075729 A | 4/1985 |
| JP | 1-195934 A | 8/1989 |
| JP | 03275968 A | * 12/1991 .......... F02M/21/02 |

OTHER PUBLICATIONS

International Search Report—PCT/DE–1/04510; ISA/EPO, Mailed: Mar. 19, 2002.

Search Report—DE 100 62 391.3, Searching Authority / German Patent Office, (in German language), mailed: Mar. 5, 2002.

* cited by examiner

Primary Examiner—Sheldon J Richter
(74) Attorney, Agent, or Firm—Karl F. Barr, Jr.

(57) ABSTRACT

The invention provides an internal combustion engine which can be run optionally on various fuels of different energy density, in particular for a motor vehicle drive, characterised in that the engine is equipped with a supercharging compressor which can be connected up when using a low-energy-density fuel at least when power requirements are elevated, so that the engine works as a supercharged engine, whereas the supercharging compressor is shut off when using a high-energy-density fuel and the engine works as a naturally aspirating engine.

5 Claims, 1 Drawing Sheet

Figure 1:
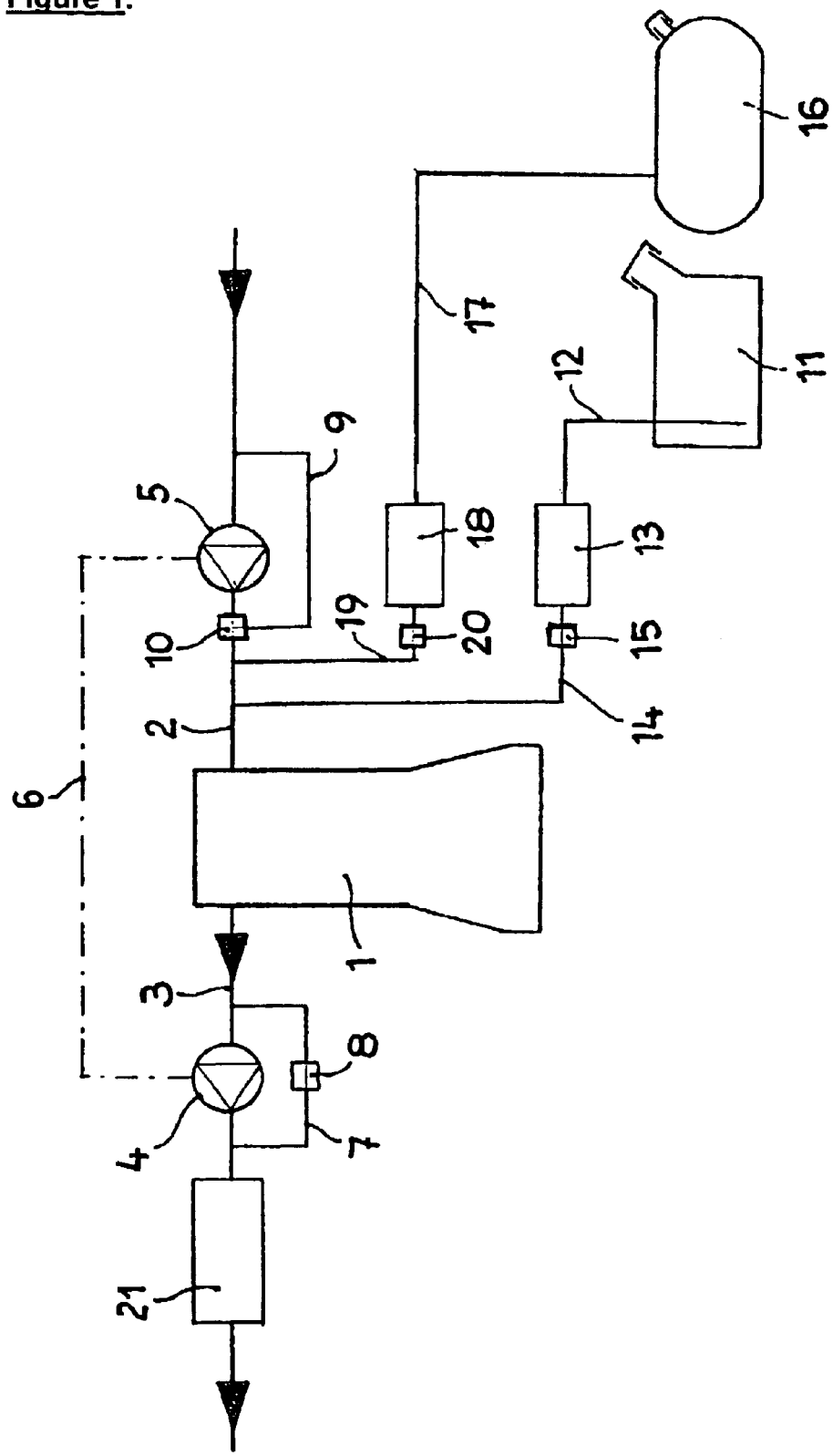

INTERNAL COMBUSTION ENGINE WHICH CAN BE OPERATED WITH A CHOICE OF DIFFERENT FUELS, ESPECIALLY FOR A MOTOR VEHICLE DRIVE SYSTEM

FIELD OF THE INVENTION

The present invention relates to an internal combustion engine operable alternatively on various fuels, in particular for a motor vehicle drive, said fuels having different energy densities, as for example in the case of natural gas and gasoline.

BACKGROUND OF THE INVENTION

As is known, the output of a conventional reciprocating piston engine operating on natural gas is about 15% below that of operation on gasoline. This applies substantially throughout the output spectrum of the engine.

When such an internal combustion engine is employed as propulsion engine in a motor vehicle, this differential output deployment is always experienced as disagreeable by the operator when full output is called for, but the engine happens to be running on the fuel of low energy density.

According to DE 195 39 170 A1, it is proposed, to remedy this disadvantage, that the engine be switched automatically to operation on the fuel of higher energy density when high output is demanded, and supplied accordingly.

However, this works only if sufficient fuel of both energy densities is available on board. If the fuel of higher energy density has been consumed, the output deficit cannot be made up by switching to that kind of fuel.

DETAILED DESCRIPTION OF THE PREFERRED EMBODIMENTS

The object of the present invention is to create an internal combustion engine operable alternatively on various fuels of diverse energy density and capable of deploying comparable constant power on the fuels available.

According to the invention, this object is accomplished in that the engine is equipped with a charge compressor which is switched on when using a fuel of low energy density, at least in event of elevated output demand, so that the engine will operate as a supercharge engine, whereas the charge compressor is switched off when using the fuel of high energy density.

The said charge compressor may take the form of a charge blower driven by a turbine driven by the exhaust gas of the engine (exhaust gas turbocharger).

Likewise, the charge compressor may be driven by the internal combustion engine itself, or alternatively by an external drive, for example an electric motor.

By the invention, an internal combustion engine is created that, when operated alternatively with several fuels of diverse energy density, exhibits a nearly constant output characteristic. This is of considerable importance when the internal combustion engine is employed to propel a motor vehicle, since the drivability of such a vehicle remains constant independently of the fuel used.

When an automatic transmission is used in such a motor vehicle, therefore, it is not necessary to provide different shift characteristics for the kinds of fuel used from time to time.

An embodiment of the invention is described below in more detail with reference to a drawing by way of example.

The drawing shows a schematic diagram of an internal combustion engine equipped according to the invention.

A reciprocating piston engine 1 is provided with an intake duct 2 and an exhaust duct 3. In the stream of the exhaust duct 3, there is an exhaust gas turbine 4. In the stream of the intake duct 2, there is a charge blower 5.

The exhaust gas turbine 4 and the charge blower 5 are mounted on a common shaft, as indicated by the dot-ash line 6, forming an exhaust gas turbocharger known per se. The exhaust gas turbine 4 is provided with an exhaust gas by-pass line 7 in the stream of which an exhaust by-pass valve 8 is arranged. The charge blower 5 is provided with a fresh air by-pass line 9, along which a fresh air by-pass valve 10 is arranged.

A fuel tank 11 is provided to hold a liquid fuel, as for example gasoline. This fuel tank 11 is in communication by way of a fuel line 12 with a fuel proportioning system 13. From the fuel proportioning system 13, another section 14 of the fuel line leads to the intake duct 2 of the reciprocating piston engine 1. In this section 14 of the fuel line, means 15 are provided to close and open the fuel line 11.

Further, a tank 16 is provided to hold a gaseous fuel, as for example natural gas. This tank 16 is in communication by way of a gas line 17 with a gas proportioning system 18. From the gas proportioning system 18, another section 19 of the gas line leads to the intake duct 2 of the piston engine In this section 19 of the gas line, means 20 are provided to close or open the gas line 17.

The means 15 and 20 are preferably embodied as electrically controllable valves.

Along the exhaust duct 3, downstream from the exhaust gas turbine 4, there is a catalyst 21 for reduction of injurious exhaust gas constituents.

The exhaust gas by-pass valve 8, the fresh air by-pass valve 10 and the means 15, 20 provided in the fuel line 12 and the gas line 17, respectively, to close or open said lines, are controlled by an electronic engine control system, not shown, which detects the operating state of the piston engine 1 by way of sensors as required from time to time.

When the piston engine 1 is to be operated on gasoline, the fresh air by-pass valve 10 and the exhaust gas by-pass valve 8 are opened. The means 20 in the line 17 are closed. The means 15 in the fuel line 12 are opened. The piston engine 1 thus operates as a straight aspiration engine on gasoline from the fuel tank 11.

But when the piston engine is to continue operation on natural gas, then the means 15 in the fuel line 12 are closed and the means 20 in the line 17 are opened. In order to make up for the reduced output of the internal combustion engine in natural gas operation compared to gasoline, the exhaust gas by-pass valve 8 and the fresh air by-pass valve 10 are closed.

The exhaust gas turbine 4 starts and drives the charge blower 5. As a result, the piston engine 1 is supplied with a greater charge than in aspirate operation, so that the output, despite use of natural gas as fuel, rises once more to the level usual in gasoline operation.

The such an internal combustion engine in a motor vehicle thus preserves the accustomed drivability even in alternative use of natural gas as fuel besides gasoline.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

What is claimed is:

1. Internal combustion engine which can be run optionally on various fuels of different energy density, in particular for a motor vehicle drive, characterised in that the engine is equipped with a supercharging compressor which can be connected up when using a low-energy-density fuel at least when power requirements are elevated, so that the engine works as a supercharged engine, whereas the supercharging compressor is shut off when using a high-energy-density fuel and the engine works as a naturally aspirating engine.

2. Internal combustion engine according to claim 1, characterised in that the supercharging compressor is designed as a supercharger (5) driven by an exhaust turbine (4).

3. Internal combustion engine according to claim 1, characterised in that the supercharging compressor is driven via a clutch directly by the engine.

4. Internal combustion engine according to claim 1, characterised in that the supercharging compressor is driven by a separate drive.

5. Internal combustion engine according to claim 4, characterised in that the separate drive for driving the supercharging compressor is formed by an electric motor.

* * * * *